US010049251B2

United States Patent
Cao et al.

(10) Patent No.: US 10,049,251 B2
(45) Date of Patent: Aug. 14, 2018

(54) ELECTRONIC DEVICE INCLUDING PUSHBUTTON SWITCH BETWEEN FINGER BIOMETRIC SENSOR AND DEVICE HOUSING AND RELATED METHODS

(71) Applicant: Apple Inc., Cupertino, CA (US)

(72) Inventors: Robert Y. Cao, San Francisco, CA (US); Ran Xu, Cupertino, CA (US); Stephen K. Pomes, San Francisco, CA (US); Brandon S. Smith, Scotts Valley, CA (US); Dinesh C. Mathew, Fremont, CA (US)

(73) Assignee: APPLE INC., Cupertino, CA (US)

( * ) Notice: Subject to any disclaimer, the term of this patent is extended or adjusted under 35 U.S.C. 154(b) by 106 days.

(21) Appl. No.: 15/262,922

(22) Filed: Sep. 12, 2016

(65) Prior Publication Data

US 2018/0075274 A1 Mar. 15, 2018

(51) Int. Cl.
*G06K 9/28* (2006.01)
*G06K 9/00* (2006.01)
*H01H 13/14* (2006.01)

(52) U.S. Cl.
CPC ......... *G06K 9/00013* (2013.01); *H01H 13/14* (2013.01)

(58) Field of Classification Search
CPC .............................. G06K 9/00013–2009/0006
See application file for complete search history.

(56) References Cited

U.S. PATENT DOCUMENTS

| 5,644,137 | A | | 7/1997 | Waggener et al. |
| 6,141,436 | A | * | 10/2000 | Srey ................... G06K 9/00013 340/5.74 |
| 8,667,297 | B2 | | 3/2014 | Salter et al. |
| 2008/0049980 | A1 | * | 2/2008 | Castaneda .......... G06K 9/00013 382/115 |
| 2008/0238878 | A1 | * | 10/2008 | Wang .................. G06F 3/03547 345/173 |
| 2011/0254771 | A1 | | 10/2011 | Zimchoni |
| 2014/0156149 | A1 | * | 6/2014 | Feit ....................... B60R 25/252 701/49 |
| 2016/0337559 | A1 | * | 11/2016 | Liu .................... G06K 9/00013 |

FOREIGN PATENT DOCUMENTS

| CN | 2462476 Y | 11/2001 |
| CN | 100374991 C | 10/2006 |
| CN | 201097315 Y | 8/2008 |
| CN | 101535926 | 9/2009 |
| CN | 102339096 | 2/2012 |
| CN | 103003782 | 3/2013 |
| CN | 106790819 | 5/2017 |
| EP | 2439613 A1 | 11/2012 |

* cited by examiner

*Primary Examiner* — Brian P Werner
(74) *Attorney, Agent, or Firm* — Allen, Dyer, Doppelt + Gilchrist, P.A.

(57) ABSTRACT

An electronic device may include a device housing having a topside and an underside. The electronic device may also include a mounting frame movable above the topside of the device housing and a finger biometric sensor carried by the mounting frame. A flexure member may be coupled to the underside of the device housing and configured to upwardly bias the mounting frame relative to the device housing. A pushbutton switch may be operatively coupled between the finger biometric sensor and the topside of the device housing.

31 Claims, 4 Drawing Sheets

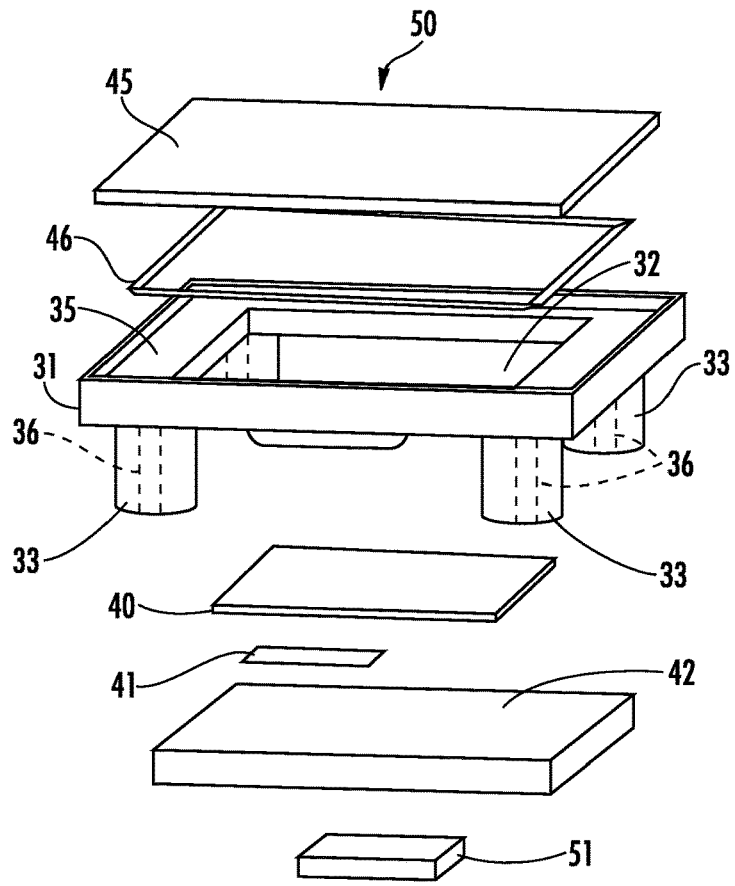
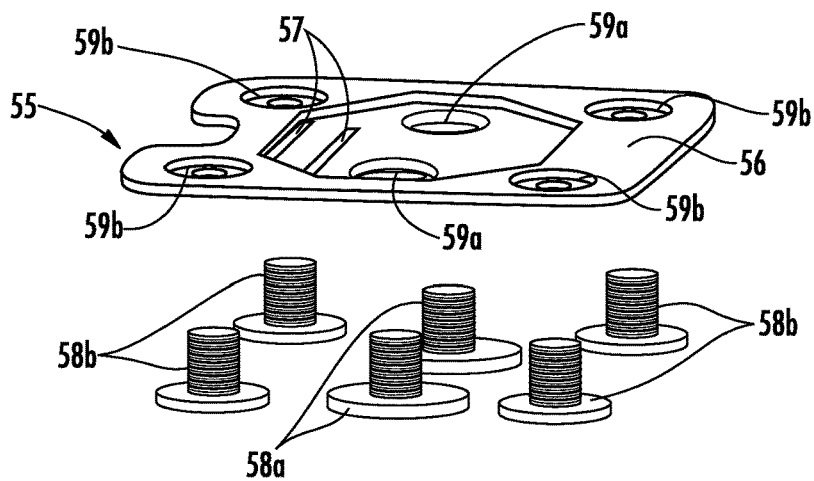
FIG. 3

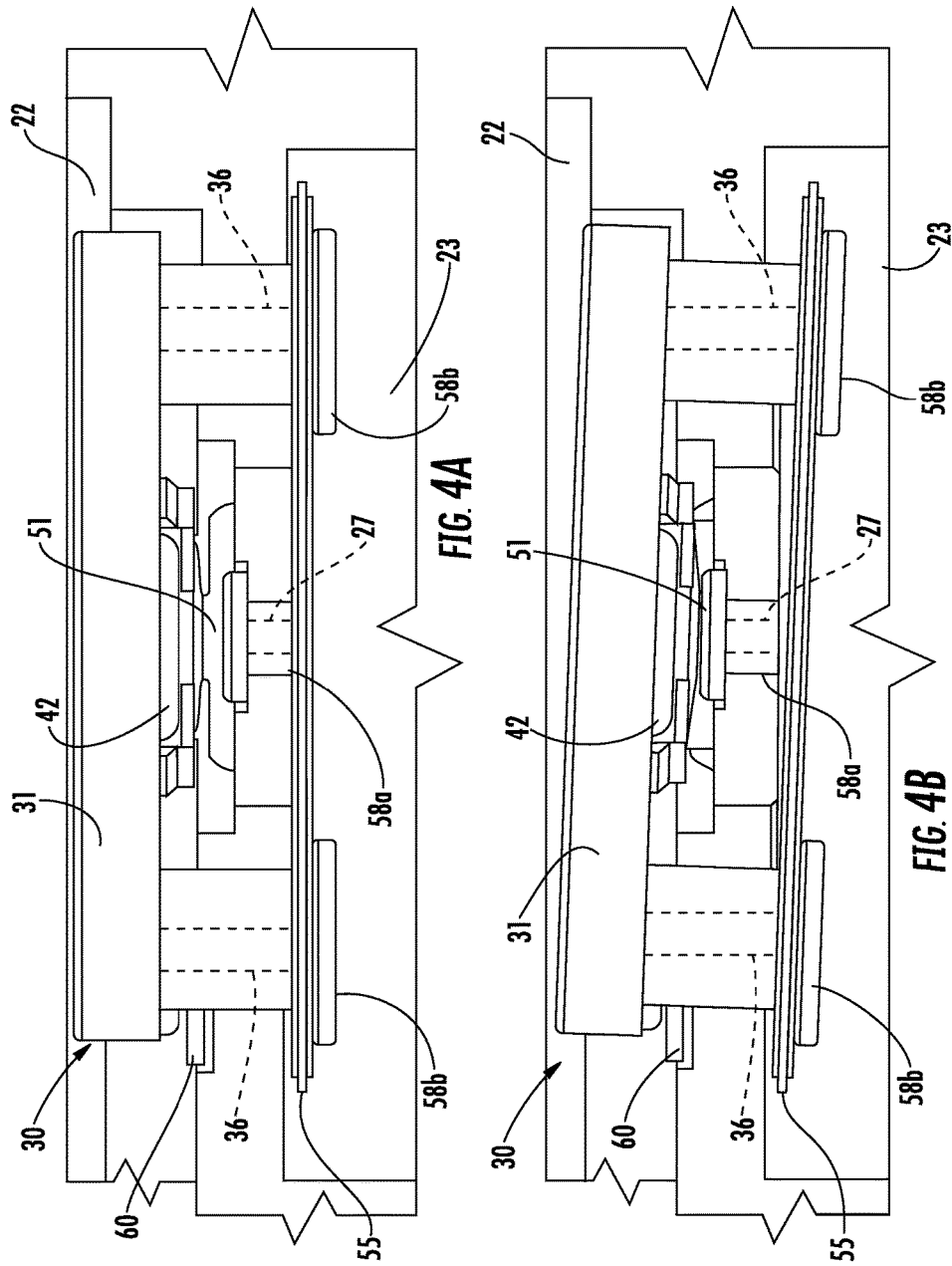

ELECTRONIC DEVICE INCLUDING PUSHBUTTON SWITCH BETWEEN FINGER BIOMETRIC SENSOR AND DEVICE HOUSING AND RELATED METHODS

TECHNICAL FIELD

The present invention relates to the field of electronics, and, more particularly, to the field of finger biometric sensors.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger.

Where a fingerprint sensor is integrated into an electronic device or host device, for example, as noted above, it may be desirable to more quickly perform authentication, particularly while performing another task or an application on the electronic device. In other words, in some instances it may be undesirable to have a user perform an authentication in a separate authentication step, for example switching between tasks to perform the authentication. It may also be desirable for a fingerprint sensor to perform other functions beyond authentication.

SUMMARY

An electronic device may include a device housing having a topside and an underside. The electronic device may also include a mounting frame movable above the topside of the device housing and a finger biometric sensor carried by the mounting frame. A flexure member may be coupled to the underside of the device housing and configured to upwardly bias the mounting frame relative to the device housing. A pushbutton switch may be operatively coupled between the finger biometric sensor and the topside of the device housing.

The electronic device may also include a pivot restrictor carried by the topside of the device housing and cooperating with the mounting frame to restrict pivoting thereof. The mounting frame may include a ring-shaped body, and a plurality of support legs extending downwardly therefrom, for example.

The electronic device may also include a respective fastener coupling each support leg to the flexure member. Each support leg may have a fastener receiving passageway therein to receive a respective fastener, for example.

The electronic device may further include a flexible circuit substrate coupled to the finger biometric sensor. The flexible circuit substrate may have an elongate shape and extends from the topside of the device housing to the underside of the device housing, for example.

The flexure member may include a resilient flat body having a plurality of slotted openings therein, for example. The electronic device may also include a cover layer carried by the mounting frame above the finger biometric sensor.

A method aspect is directed to a method of making an electronic device. The method may include positioning a mounting frame to be movable above a topside of a device housing and positioning a finger biometric sensor to be carried by the mounting frame. The method may also include coupling a flexure member to the underside of the device housing to upwardly bias the mounting frame relative to the device housing and operatively coupling a pushbutton switch between the finger biometric sensor and the topside of the device housing.

BRIEF DESCRIPTION OF THE DRAWINGS

FIG. 3 is an exploded view of an input device of an electronic device in accordance with an embodiment.

FIG. 4a is a partial side view of a portion of an electronic device in accordance with an embodiment.

FIG. 4b is a partial side of the portion of the electronic device of FIG. 4a with the input device depressed.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
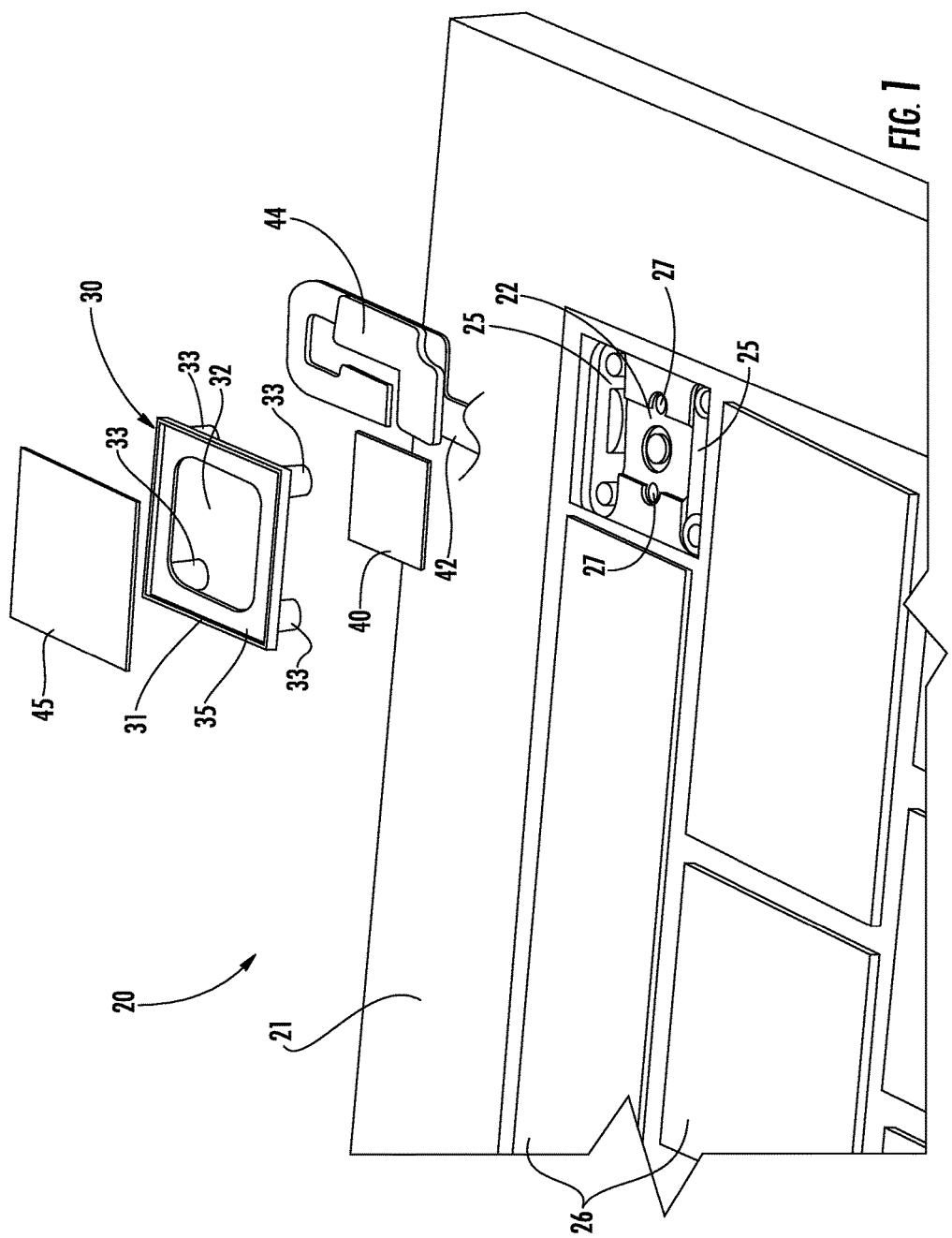
FIG. 1 is a partially exploded perspective view of a portion of an electronic device in accordance with an embodiment.
Figure 2:
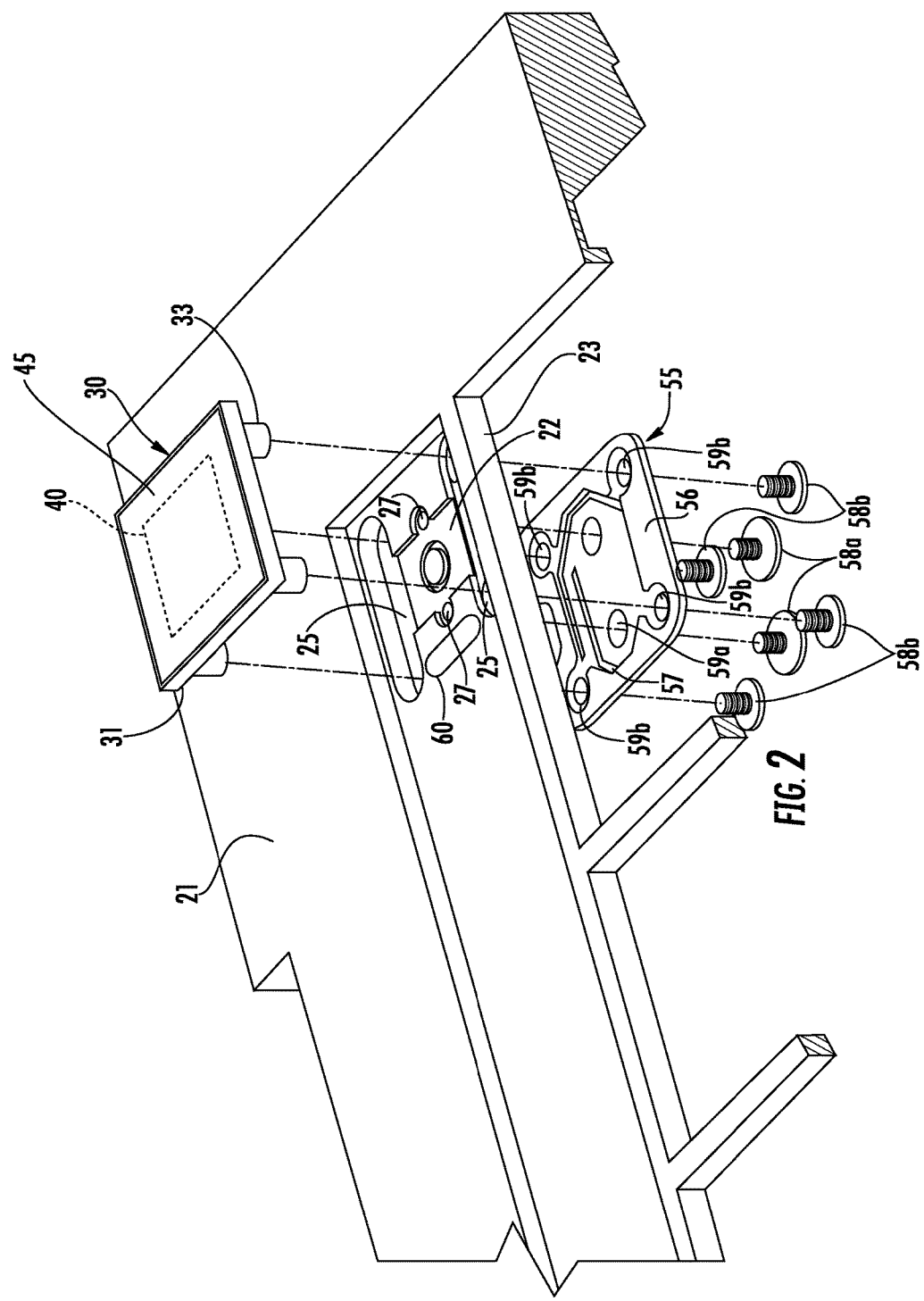
FIG. 2 is another partially exploded perspective view of a portion of an electronic device in accordance with an embodiment.

Referring initially to FIGS. 1-3, an electronic device 20 includes a device housing 21. The device housing has a topside 22 (e.g. outside the device housing) and an underside 23 (e.g., within the device housing). While the electronic device 20 is illustratively in the form of a laptop computer having input devices 26 in the form of keyboard keys for performing respective functions, it should be understood that the electronic device may be in the form of another type of electronic device, for example, a mobile wireless communications device or smartphone, tablet computer, stand-alone keyboard or input device, or other electronic device. The device housing 21 may have openings 25 therein to permit passage from the topside 22 to the underside 23.

The electronic device 20 also includes, as part of an input device 50 or keyboard key, a mounting frame 30 that is movable above the topside 22 of the device housing 21. The mounting frame 30 includes a ring-shaped body 31. More particularly, the ring-shaped body 31 is shaped in a rectangular or square keyboard key shape and has an opening 32 therein. The ring-shaped body 31 also includes a support member 35 defining a ledge that is recessed relative to a top of the ring-shaped body 31. Of course the ring-shaped body 31 may have another ring-shape, for example, be round.

The mounting frame 30 also includes support legs 33 extending downwardly from the ring-shaped body 31. Illustratively, there are four support legs 33 that extend downwardly from the ring-shaped body 31 at the corners of the ring-shaped body. While there are illustratively four support legs 33, there may be any number of support legs, and the support legs may not be positioned at the corners. Each support leg 33 has a respective fastener receiving passageway 36 therein to receive a respective fastener 58b, as will be described in further detail below.

A finger biometric sensor 40 is carried within the opening 32 in the ring-shaped body 31 of the mounting frame 30. The finger biometric sensor 40 may be a capacitive or electric field based finger biometric sensor, for example, and may be configured to cooperate to perform at least one of an authentication function, navigation function, and spoof detection function, for example. In some embodiments, the finger biometric sensor 40 may be an optical sensor, or other type of finger biometric sensor, as will be appreciated by those skilled in the art.

A cover layer 45 is carried by the mounting frame 30 over the finger biometric sensor 40. More particularly, the cover layer 45 is carried by the support member 35 within the recess so that the cover layer is flush or nearly flush with the top of the mounting frame 30. The cover layer 45 may include sapphire, glass, or other dielectric material and may define a finger placement surface for a user's finger.

An adhesive ring 46 is coupled between the cover layer 45 and the support member 35 of the mounting frames (FIG. 3). The adhesive ring 46, which may be in the form of a pre-cut glue ring, secures the cover layer 45 to the support member 35.

An integrated circuit (IC) 41 is coupled to an underside of the finger biometric sensor 40. The IC 41 may be a level translation IC, for example. The IC 41 may perform other and/or additional functions and may be positioned elsewhere, for example, carried by a flexible circuit substrate 42.

The flexible circuit substrate 42 couples to or carries the finger biometric sensor 40. The flexible circuit substrate 42 illustratively has an elongate shape and extends from the topside 22 of the device housing 21 to the underside 23 of the device housing. A connector may be coupled to the flexible circuit substrate 42 and may be located adjacent the components elsewhere in the device housing 21, for example. An adhesive coupling pad 44 (FIG. 1) may couple the flexible circuit substrate 42 within the device housing 21, for example, to hold or affix the flexible circuit substrate in place.

A pushbutton switch 51 is operatively coupled between the finger biometric sensor 40 and the topside 22 of the device housing 21. The pushbutton switch 51, more particularly, may mount to an underside of the flexible circuit substrate 42. The pushbutton switch 51 may actuate based upon downward movement of the support member 30 above the topside 22 of the device housing. In other words, downward pressure, for example, from a user's finger on the support member 30 and more particularly, the cover layer 45 moves the support member downward to actuate the pushbutton switch against the topside 22 of the device housing 21. The pushbutton switch 51 may be coupled, via the flexible circuit substrate 42, to circuitry for performing a respective function, for example, a power-on function.

The mounting frame 30 is biased upwardly relative to the device housing 21 by a flexure member 55 coupled to the underside 23 of the device housing 21. Based upon the upward bias of the mounting frame 30, the pushbutton switch 51 is thus not normally actuated (i.e., in the depressed position). The flexure member 55 illustratively has a resilient flat body 56 that includes slotted openings 57 therein.

The slotted openings 57 cooperate to permit the resilient flat body 56 to flex upon downward movement or pressure. Fasteners 58a pass through fastener openings 59a in the flexure member 55 to couple the flexure member to the underside 23 of the device housing 21, for example, to respective fastener receiving passageways 27 in the device housing 21. The fasteners 58a may include any of screws, rivets, and/or other fastening mechanism.

The resilient flat body 56 of the flexure member 55 has fastener openings 59b at the corners thereof aligned with the support legs 33 of the mounting frame 30. Respective fasteners 58b couple the flexure member 55 to each of the support legs 33 receiving the fasteners within the respective fastener receiving passageways 35.

Referring additionally to FIGS. 4a and 4b, the electronic device 20 may also include a pivot restrictor 60 carried by the topside 22 of the device housing 21. The pivot restrictor 60 cooperates with the mounting frame 30 to restrict pivoting thereof. In other words, upon downward pressure to the cover layer 45, the mounting frame 30 moves in a pivot motion about the pivot restrictor 60 above the topside 22 of the device housing 21. As will be appreciated by those skilled in the art, the pivot restrictor 60 may reduce the amount of x and y axis motion and restrict z-axis movement on the side of the pivot restrictor 60 to nearly no displacement, while there may be about 100-200 microns of displacement on the side opposite the pivot restrictor. It will be appreciated that in some embodiments, the electronic device 20 may not include the pivot restrictor 60.

As will be appreciated by those skilled in the art, including a finger biometric sensor 40 in the input device 50 or keyboard key may advantageously permit multiple functions to be performed. For example, a given function, for example, power-on, may occur based upon operation of the pushbutton switch 51 or placement of and downward pressure on the cover layer 45. During operation of the pushbutton switch 51, the finger biometric sensor 40 may perform an authentication function, for example. Thus, a given user may be authenticated during a power-on operation.

A method aspect is directed to a method of making an electronic device 20. The method includes positioning a mounting frame 30 to be movable above a topside 22 of a device housing 21 and positioning a finger biometric sensor 40 to be carried by the mounting frame. The method also includes coupling a flexure member 55 to the underside 23 of the device housing 21 to upwardly bias the mounting frame 30 relative to the device housing 20, operatively coupling a pushbutton switch 51 between the finger biometric sensor and the topside 22 of the device housing.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data, and further contemplates user restrictions on storing data in cloud-based services and/or restricting access to the same. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Many modifications and other embodiments will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a device housing wall having a topside and an underside;
a mounting frame movable above the topside of the device housing wall;
a finger biometric sensor carried by the mounting frame;
a flexure member coupled to the underside of the device housing wall and configured to upwardly bias the mounting frame relative to the device housing wall; and
a pushbutton switch operatively coupled between the finger biometric sensor and the topside of the device housing wall.

2. The electronic device of claim 1 further comprising a pivot restrictor carried by the topside of the device housing wall and cooperating with the mounting frame to restrict pivoting thereof.

3. The electronic device of claim 1 wherein the mounting frame comprises a ring-shaped body, and a plurality of support legs extending downwardly therefrom.

4. The electronic device of claim 3 further comprising a respective fastener coupling each support leg to the flexure member.

5. The electronic device of claim 4 wherein each support leg has a fastener receiving passageway therein to receive a respective fastener.

6. The electronic device of claim 1 further comprising a flexible circuit substrate coupled to the finger biometric sensor.

7. The electronic device of claim 6 wherein the flexible circuit substrate has an elongate shape and extends from the topside of the device housing wall to the underside of the device housing wall.

8. The electronic device of claim 1 wherein the flexure member comprises a resilient flat body having a plurality of slotted openings therein.

9. The electronic device of claim 1 further comprising a cover layer carried by the mounting frame above the finger biometric sensor.

10. An input device for an electronic device comprising a device housing wall having a topside and an underside, the input device comprising:
a mounting frame movable above the topside of the device housing wall;
a finger biometric sensor carried by the mounting frame;
a flexure member coupled to the underside of the device housing wall and configured to upwardly bias the mounting frame relative to the device housing wall; and
a pushbutton switch operatively coupled between the finger biometric sensor and the topside of the device housing wall.

11. The input device of claim 10 further comprising a pivot restrictor carried by the topside of the device housing wall and cooperating with the mounting frame to restrict pivoting thereof.

12. The input device of claim 10 wherein the mounting frame comprises a ring-shaped body, and a plurality of support legs extending downwardly therefrom.

13. The input device of claim 12 further comprising a respective fastener coupling each support leg to the flexure member.

14. The input device of claim 13 wherein each support leg has a fastener receiving passageway therein to receive a respective fastener.

15. The input device of claim 10 further comprising a flexible circuit substrate coupled to the finger biometric sensor.

16. A method of making an electronic device comprising:
positioning a mounting frame to be movable above a topside of a device housing wall;
positioning a finger biometric sensor to be carried by the mounting frame;
coupling a flexure member to the underside of the device housing wall to upwardly bias the mounting frame relative to the device housing wall; and
operatively coupling a pushbutton switch between the finger biometric sensor and the topside of the device housing wall.

17. The method of claim 16 further comprising positioning a pivot restrictor to be carried by the topside of the device housing wall and cooperating with the mounting frame to restrict pivoting thereof.

18. The method of claim 16 wherein the mounting frame comprises a ring-shaped body, and a plurality of support legs extending downwardly therefrom; and further comprising a respective fastener coupling each support leg to the flexure member.

19. The method of claim 16 further comprising coupling a flexible circuit substrate to the finger biometric sensor.

20. The method of claim 16 further comprising positioning a cover layer to be carried by the mounting frame above the finger biometric sensor.

21. An electronic device comprising:
a device housing having a topside and an underside;

a mounting frame movable above the topside of the device housing, the mounting frame comprising a ring-shaped body and a plurality of support legs extending downwardly therefrom;
a finger biometric sensor carried by the mounting frame;
a flexure member coupled to the underside of the device housing and configured to upwardly bias the mounting frame relative to the device housing;
a respective fastener coupling each support leg to the flexure member; and
a pushbutton switch operatively coupled between the finger biometric sensor and the topside of the device housing.

22. The electronic device of claim 21 further comprising a pivot restrictor carried by the topside of the device housing and cooperating with the mounting frame to restrict pivoting thereof.

23. The electronic device of claim 21 wherein each support leg has a fastener receiving passageway therein to receive a respective fastener.

24. The electronic device of claim 21 further comprising a flexible circuit substrate coupled to the finger biometric sensor.

25. The electronic device of claim 24 wherein the flexible circuit substrate has an elongate shape and extends from the topside of the device housing to the underside of the device housing.

26. The electronic device of claim 21 wherein the flexure member comprises a resilient flat body having a plurality of slotted openings therein.

27. The electronic device of claim 21 further comprising a cover layer carried by the mounting frame above the finger biometric sensor.

28. An input device for an electronic device comprising a device housing having a topside and an underside, the input device comprising:
a mounting frame movable above the topside of the device housing, the mounting frame comprising a ring-shaped body and a plurality of support legs extending downwardly therefrom;
a finger biometric sensor carried by the mounting frame;
a flexure member coupled to the underside of the device housing and configured to upwardly bias the mounting frame relative to the device housing;
a respective fastener coupling each support leg to the flexure member; and
a pushbutton switch operatively coupled between the finger biometric sensor and the topside of the device housing.

29. The input device of claim 28 further comprising a pivot restrictor carried by the topside of the device housing and cooperating with the mounting frame to restrict pivoting thereof.

30. The input device of claim 28 wherein each support leg has a fastener receiving passageway therein to receive a respective fastener.

31. The input device of claim 28 further comprising a flexible circuit substrate coupled to the finger biometric sensor.

* * * * *